(12) United States Patent
Tanaka et al.

(10) Patent No.: US 9,531,023 B2
(45) Date of Patent: Dec. 27, 2016

(54) EXHAUST STATE CONTROL DEVICE FOR FUEL CELL FOR MOBILE UNIT

(71) Applicants: Hiromi Tanaka, Susono (JP); Keigo Suematsu, Susono (JP); Takahide Izutani, Susono (JP)

(72) Inventors: Hiromi Tanaka, Susono (JP); Keigo Suematsu, Susono (JP); Takahide Izutani, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 562 days.

(21) Appl. No.: 13/856,885

(22) Filed: Apr. 4, 2013

(65) Prior Publication Data

US 2013/0289813 A1 Oct. 31, 2013

Related U.S. Application Data

(62) Division of application No. 12/671,042, filed as application No. PCT/IB2008/002012 on Jul. 31, 2008, now abandoned.

(30) Foreign Application Priority Data

Aug. 1, 2007 (JP) .................... 2007-201241

(51) Int. Cl.
*H01M 8/04* (2016.01)
*H01M 8/06* (2016.01)
*B60L 11/18* (2006.01)

(52) U.S. Cl.
CPC ........ *H01M 8/0662* (2013.01); *B60L 11/1881* (2013.01); *H01M 8/04007* (2013.01);
(Continued)

(58) Field of Classification Search
CPC ............ H01M 8/0662; H01M 8/04007; H01M 8/04156; H01M 2250/20; Y02E 60/50; Y02T 90/32; B60L 11/1881
See application file for complete search history.

(56) References Cited

U.S. PATENT DOCUMENTS

2008/0088821 A1* 4/2008 Hurvitz et al. .................. 356/51

FOREIGN PATENT DOCUMENTS

| JP | 05209828 A | * | 8/1993 | ............. G01N 21/23 |
| JP | 7-169498 | | 7/1995 | |

(Continued)

OTHER PUBLICATIONS

Machine translation for Naganuma, JP 2005-222892 A.*
Machine translation for Igarashi et al., JP 05-209828 A.*
Machine translation for Funahashi et al., JP 2003-286887 A.*

*Primary Examiner* — Raymond Alejandro
(74) *Attorney, Agent, or Firm* — Finnegan, Henderson, Farabow, Garrett & Dunner, LLP

(57) ABSTRACT

An exhaust state control device for a fuel cell for a mobile unit includes an exhaust gas temperature sensor (17) that measures the temperature of exhaust gas in a discharge passage that discharges the exhaust gas from the main body of the fuel cell, and an ambient temperature sensor (19A) that measures the temperature of ambient air to which exhaust gas is to be discharged. If, based on the difference between the exhaust gas temperature and the ambient temperature, it is determined that white smoke is generated, it is determined whether a condition to reduce white smoke is satisfied. When a first condition is satisfied, a process to reduce white smoke is activated. When a second condition, which requires further reduction of white smoke than under the first condition, is satisfied, a process to suppress the generation of white smoke is activated.

3 Claims, 11 Drawing Sheets

SYSTEM OUTLINE

(52) U.S. Cl.
CPC .... *H01M 8/04156* (2013.01); *H01M 2250/20* (2013.01); *Y02E 60/50* (2013.01); *Y02T 90/32* (2013.01)

(56) References Cited

FOREIGN PATENT DOCUMENTS

| | | | | |
|---|---|---|---|---|
| JP | 2001-185199 | 7/2001 | | |
| JP | 2003286887 A | * 10/2003 | ............. | F02D 45/00 |
| JP | 2005-153853 | 6/2005 | | |
| JP | 2005-222892 | 8/2005 | | |
| JP | 2005-222897 | 8/2005 | | |
| JP | 2005222892 A | * 8/2005 | ............. | H01M 8/06 |
| JP | 2005-299853 | 10/2005 | | |
| JP | 2008-130392 | 6/2008 | | |
| JP | 2008-269983 A | 11/2008 | | |
| JP | 2009-37870 | 2/2009 | | |
| WO | WO 0022881 A2 | * 4/2000 | | |
| WO | WO 2004/006372 A1 | 1/2004 | | |

* cited by examiner

FIG.4

|  | WHITE SMOKE REDUCTION CONTROL 1 | WHITE SMOKE REDUCTION CONTROL 2 | WHITE SMOKE REDUCTION CONTROL 3 |
|---|---|---|---|
| SCAVENGING AIR (AIR SUPPLY AMOUNT) | DECREASED BY 30% | DECREASED BY 60% | DECREASED BY 100% |
| HEATING POWER | 300W | 600W | 1000W |

FIG.8

| ΔT \ HUMIDITY | H | I | J | K | L | M | N |
|---|---|---|---|---|---|---|---|
| A | × | × | × | × | × | × | × |
| B | × | × | × | × | × | × | × |
| C | × | × | × | × | × | × | × |
| D | × | × | × | × | × | × | ○ |
| E | × | × | × | × | × | ○ | ○ |
| F | × | × | × | × | ○ | ○ | ○ |
| G | × | × | × | ○ | ○ | ○ | ○ |

EXHAUST STATE CONTROL DEVICE FOR FUEL CELL FOR MOBILE UNIT

This is a division of application Ser. No. 12/671,042, which is a national phase of International Application No. PCT/IB2008/002012, filed Jul. 31, 2008, and claims the priority of Japanese Application No. 2007-201241, filed Aug. 1, 2007, all of which are incorporated herein by reference.

BACKGROUND OF THE INVENTION

1. Field of the Invention

The present invention relates to a technique to control the exhaust state for a fuel cell for a mobile unit.

2. Description of the Related Art

In fuel cells, a reaction generates electricity and discharges a corresponding amount of generated water. Especially in fuel cells for automobiles, a larger amount of water is generated as the vehicle travels a longer distance. Most fuel cells for automobiles are of a solid polymer type, which basically operates at low temperatures. A common problem with the fuel cells is the treatment of the generated water, that is, preventing the generated water from freezing on the road in cold regions or from splashing toward any following vehicles.

Depending on the ambient air conditions and the driving conditions, however, it is also necessary to suppress the generation of white smoke from the exhaust port of a discharge passage for off gas. Generation of the white smoke is not desirable from the standpoint of the merchantability of the automobiles. In some instances, the impact of the automobiles on the surroundings due to the white smoke should be taken into account. In view of the above, proposals have been made to suppress the white smoke in fuel cells for vehicles in Japanese Patent Application Publication No. 7-169498 (JP-A-7-169498) and Japanese Patent Application Publication No. 2001-185199 (JP-A-2001-185199).

To reduce the white smoke, in general, the fuel cells for vehicles have adopted means for cooling or heating the off gas beyond the temperature range where white smoke is easily generated, means for suppressing the amount of scavenged air, and so forth. Therefore, energy is required to reduce the white smoke, which contradicts the requirement to improve the power generation efficiency.

That is, the fuel cells described in the above documents estimate the generation of white smoke mainly based on the difference between the exhaust air temperature and the ambient temperature. Then, a white smoke reduction process is executed according to the estimation results. If the white smoke reduction process is executed frequently, the fuel efficiency is reduced due to the heating, the energy efficiency is reduced, the output is reduced due to the suppressed amount of scavenged air, etc., to a larger degree.

As a result of a more detailed examination of the circumstances where the white smoke is generated, the following may be pointed out. The white smoke generated is not noticeable while the vehicle is in motion because of the diffusion effect of the head wind, but is noticeable while the vehicle is stationary or traveling at low speeds. The visibility of the white smoke varies in accordance with the environmental conditions around the vehicle, such as whether it is daytime or nighttime and whether it is sunny or rainy. The white smoke generated affects the vision of the operator when backing the vehicle.

SUMMARY OF THE INVENTION

The present invention provides an exhaust state control device for a fuel cell for a mobile unit, such as a vehicle, powered by a fuel cell, that determines the necessity for white smoke reduction based on the traveling conditions of the mobile unit, the operating state of the mobile unit, or the environmental conditions to efficiently suppress the white smoke.

An aspect of the present invention is directed to an exhaust state control device for a fuel cell for a mobile unit that detects a state of exhaust gas from a fuel cell provided in the mobile unit. The exhaust state control device for the fuel cell includes: a white smoke generation determination section that determines whether white smoke is generated based on relationship between a state of the exhaust gas and a state of the ambient air; a motion sensor that detects movement of the mobile unit; a condition determination section that determines whether a condition to reduce white smoke is satisfied based on a detection signal from the motion sensor when the white smoke generation determination section determines that white smoke is generated; and a control section that activates a process to reduce white smoke if the condition determination section determines that a predetermined condition is satisfied.

The exhaust state control device for a fuel cell for a mobile unit may further include: an operation state sensor that detects an operating state of an operating section that operates the mobile unit; and a sensor that senses a surrounding environmental state of the mobile unit, and the condition determination section may determine whether the condition to reduce white smoke is satisfied based on at least one of the detected moving state of the mobile unit, the detected operating state of the operating section that operates the mobile unit, and the detected surrounding environmental state of the mobile unit.

In the exhaust state control device for a fuel cell for a mobile unit, the control section may activate a process to reduce white smoke when the condition determination section determines that a first predetermined condition is satisfied, and activate a process to further reduce generation of white smoke than when the first predetermined condition is determined to be satisfied, if the condition determination section determines that a second predetermined condition is satisfied.

The exhaust state control device for a fuel cell for a mobile unit according to the above aspect may further include: an exhaust gas temperature sensor that measures a temperature of the exhaust gas in a discharge passage that discharges the exhaust gas from a main body of the fuel cell; and an ambient temperature sensor that measures a temperature of the ambient air to which the exhaust gas is to be discharged, and the white smoke generation determination section may determine whether white smoke is generated according to the difference between the exhaust gas temperature and the ambient temperature.

The exhaust state control device for a fuel cell for a mobile unit according to the above aspect may further include: an exhaust gas temperature sensor that measures a temperature of the exhaust gas in a discharge passage that discharges the exhaust gas from a main body of the fuel cell; an ambient temperature sensor that measures a temperature of the ambient air to which the exhaust gas is to be discharged; and an ambient humidity sensor that measures a humidity of the ambient air to which the exhaust gas is to be discharged, and the white smoke generation determination section may determine whether white smoke will be generated according to the difference between the exhaust gas temperature and the ambient temperature and the ambient humidity.

According to the above aspect, if it is determined that white smoke will be generated, white smoke reduction can be performed in different levels by determining whether the first condition is satisfied or the second condition, which requires greater reduction of white smoke than the first condition does, is satisfied. In general, the process to further reduce white smoke lowers the efficiency of the fuel cell for a mobile unit more than the process to reduce white smoke does. Thus, the exhaust state control device for a fuel cell for a mobile unit can improve the efficiency of the fuel cell for a mobile unit by determining in detail the conditions under which white smoke is generated to perform the white smoke reduction process in different levels.

In the above aspect, the first condition may be satisfied if either one of the conditions, where a moving speed of the mobile unit is determined to be at or below a predetermined value and where a visibility of white smoke around the mobile unit is determined to be higher than that in a reference environment, is satisfied; and the second condition may be satisfied if both the conditions, where the moving speed of the mobile unit is determined to be at or below the predetermined value and where the visibility of white smoke around the mobile unit is determined to be higher than that in the reference environment, are satisfied. According to the above aspect, the exhaust state control device for a fuel cell for a mobile unit can determine in detail the circumstances where white smoke is generated by defining the first condition and the second condition which requires greater reduction of white smoke than the first condition does.

In the above aspect, the condition where the moving speed of the mobile unit is determined to be at or below the predetermined value may include a state where the mobile unit is stationary. Greater reduction of white smoke is occasionally required when the vehicle is stationary than when it is moving. In the above aspect, the moving speed of the mobile unit may be an absolute speed of the mobile unit or a relative speed between the mobile unit and the ambient air around the mobile unit. The generation and the visibility of white smoke are affected by the relative speed between the mobile unit and the ambient air.

In the above aspect, the mobile unit may be a vehicle; the first condition may be satisfied if either one of conditions, where a shift lever is determined to be in a parking position and where a visibility of white smoke around the mobile unit is determined to be higher than that in a reference environment, is satisfied; and the second condition the second condition may be satisfied if both the conditions, where the shift lever is determined to be in the parking position and where the visibility of white smoke around the mobile unit can be determined to be higher than that in the reference environment, are satisfied.

In the above aspect; the first condition may be satisfied if either one of conditions, where the white smoke generation determination section determines that white smoke is generated or a condition where a moving speed of the mobile unit is at or below a predetermined value and where a visibility of white smoke around the mobile unit is determined to be lower than that in a reference environment, is satisfied; and the second condition may be satisfied if both the conditions, where the moving speed of the mobile unit is determined to be at or below the predetermined value and where the visibility of white smoke around the mobile unit is determined to be higher than that in the reference environment, are satisfied.

In the above aspect, if the conditions, where the white smoke generation determination section determines that white smoke is generated, and where the moving speed of the mobile unit is at or below the predetermined value and the visibility of white smoke around the mobile unit is determined to be lower than that in the reference environment, are satisfied, the condition determination section may perform the process to reduce white smoke, in the case the condition determination section determined that the first predetermined condition has been satisfied, in different level.

In the above aspect, the first condition may be satisfied if either one of conditions, where a vision of an operator who operates the mobile unit is determined to be affected by white smoke and where a visibility of white smoke around the mobile unit is higher than that in a reference environment, is satisfied; and the second condition maybe satisfied if both the condition, where the vision of the operator who operates the mobile unit is determined to be affected by white smoke and where the visibility of white smoke around the mobile unit is higher than that in the reference environment, are satisfied. According to the above aspect, the exhaust state control device for a fuel cell for a mobile unit can determine in detail the circumstances where white smoke is generated by defining the first condition and the second condition which requires greater reduction of white smoke than the first condition does.

In the above aspect, the reference environment may include at least one of a daytime environment and a non-rainy environment. The visibility of white smoke is considered to be lowest in daytime and non-rainy environments.

In the above aspect, the mobile unit may be a vehicle; the operating state of the operating section may be determined based on whether a headlight is on; the surrounding environmental state may be determined based on at least one of: whether a darkness detection signal for an automatic light is on; whether a current time is after a sunset and before a sunrise; whether a signal from a global positioning system cannot be received; whether a wiper is on; whether a rain sensing signal is on; and whether a detection value of the ambient humidity sensor exceeds a predetermined value; and the condition determination section may determine that the reference environment is the daytime, non-rainy environment and the ambient humidity is less than the predetermined value if none of the determined states above is satisfied.

In the above aspect, it may be determined that the white smoke interferes with the vision of the operator when the mobile unit advances in a discharging direction of the exhaust gas. The possibility that the white smoke will interfere with the vision of the operation increases if the white smoke is at the advance direction and the operator is looking in the advance direction of the mobile unit.

In the above aspect, the mobile unit may be a vehicle; and it may be determined that the condition where the white smoke interferes with vision of the operator of the mobile unit is satisfied when at least one of the shift lever is in a reverse position and the parking brake is off.

In the above aspect, the process to reduce white smoke may be at least one of a process to control the exhaust gas temperature and a process to control a flow rate of the exhaust gas at an air electrode side of the fuel cell. The generation of white smoke can be controlled by the exhaust gas temperature and the flow rate of the exhaust gas at the air electrode side.

In the above aspect, discharge of the exhaust gas at the air electrode side may be controlled such that a limit of the flow rate of the exhaust gas decreases as the moving speed of the mobile unit decreases. The generation of white smoke is reduced and the visibility of white smoke is lowered when the moving speed of the mobile unit is at or above a predetermined value.

In the above aspect, a pressure or the flow rate of the exhaust gas at the air electrode side may be controlled such that the limit of the flow rate of the exhaust gas increases as the pressure of the exhaust gas increases. To discharge the same amount in mass of exhaust gas, the volumetric flow rate of the gas is decreased as the pressure of the gas is increased. Therefore, to discharge the same amount in mass of exhaust gas, the amount of water vapor to be discharged is reduced as the pressure of the exhaust gas is higher. To maintain approximately the same amount of water vapor to be discharged, a larger amount in mass of exhaust gas can be discharged when the pressure of the exhaust gas is increased than when the pressure is not increased.

In the above aspect, the process to reduce the generation of white smoke, which is performed when the condition determination section determines that the second predetermined condition is satisfied, includes at least one of stopping scavenging air and shutting off a hydrogen supply pressure to the fuel cell.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 shows the classification of the white smoke reduction process;

FIG. 8 shows an example of the map showing white smoke reduction regions;

DETAILED DESCRIPTION OF EMBODIMENTS

A fuel cell system according to a first embodiment of the present invention is described below with reference to FIGS. 1 to 3.

Figure 1:
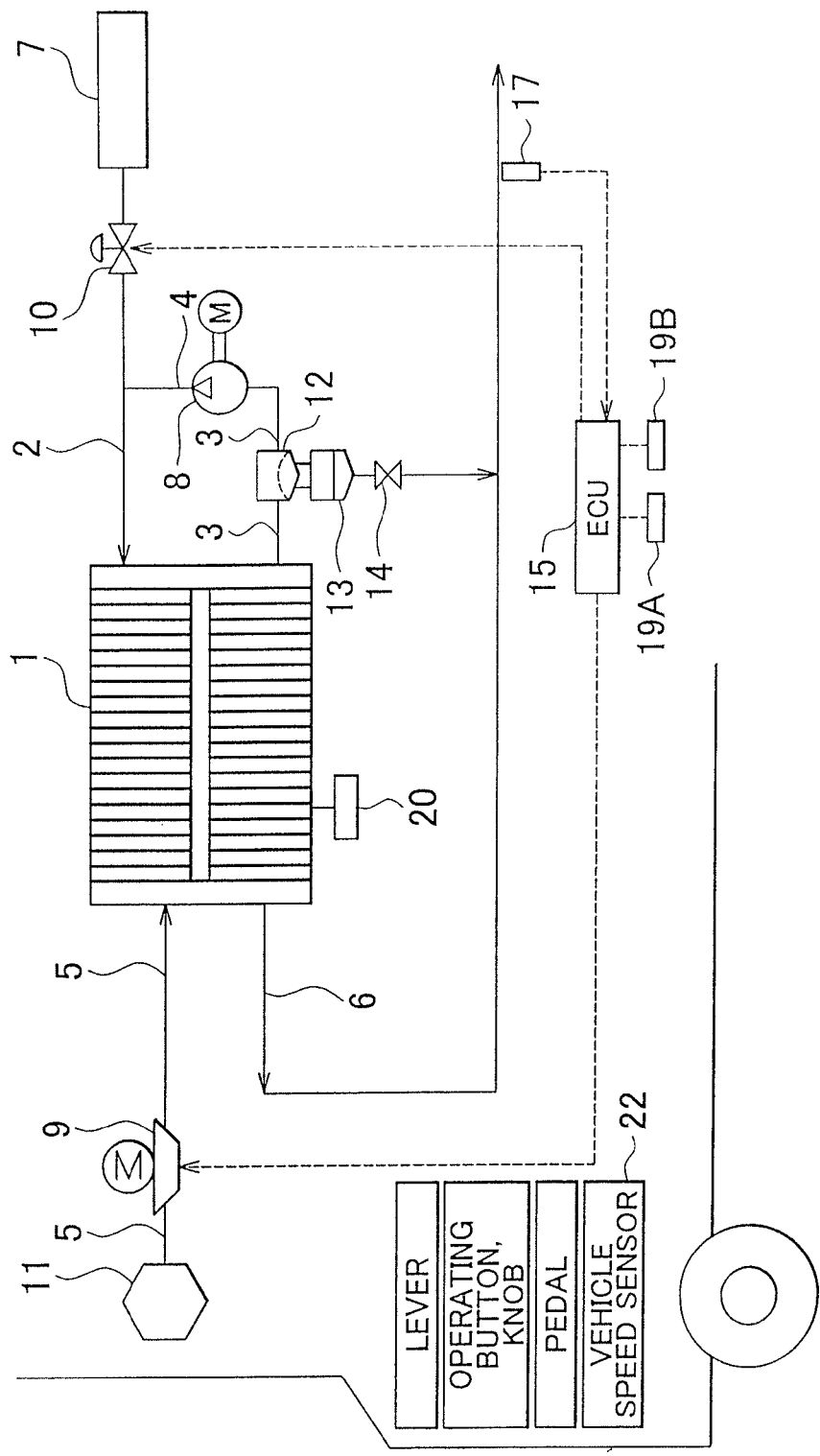
FIG. 1 shows an example configuration of a fuel cell system.

FIG. 1 shows an example configuration of a fuel cell system in accordance with an embodiment of the present invention. As shown in FIG. 1, the fuel cell system includes a fuel cell stack 1. The fuel cell system also includes, a hydrogen tank 7, which serves as its hydrogen system that supplies hydrogen to the fuel cell stack 1; a pressure regulator 10, an anode gas passage 2, an anode off gas passage 3, a hydrogen pump 8, an anode off gas circulation passage 4, a gas-liquid separator 12, which separates water from anode off gas; a drain tank 13, and an exhaust/drain valve 14. The fuel cell system additionally includes, as its air system that supplies air to the fuel cell stack 1, an air filter 11, a pump 9, a cathode gas passage 5, and a cathode off gas passage 6. The fuel cell system further includes, as its control system and measurement system, an electronic control unit (ECU, equivalent to the exhaust state control device for a fuel cell for a mobile unit) 15, a discharge gas temperature sensor 17, an ambient temperature sensor 19A, an ambient humidity sensor 19B, and a stack temperature sensor 20. As shown schematically in FIG. 1, the fuel cell system is mounted on a mobile unit such as a vehicle to function as a power source for the mobile unit.

The fuel cell stack 1 is composed of a plurality of cells stacked over each other. Each cell is composed of an electrolyte membrane, an anode (fuel electrode), a cathode (air electrode), and a separator. Flow paths for hydrogen and air are formed between the anode and the cathode.

The hydrogen tank 7 supplies anode gas to the anode gas passage 2. The anode gas supplied from the hydrogen tank 7 is adjusted to a predetermined pressure by the pressure regulator 10. Then, the anode gas is supplied from the anode gas passage 2 to the anode of the fuel cell stack 1.

Air drawn via the air filter 11 is supplied through the cathode gas passage 5 to the cathode of the fuel cell stack 1 from outside the fuel cell system by the pump 9 (which may be an air compressor).

When the anode gas is supplied to the anode of the fuel cell stack 1, hydrogen ions are generated from hydrogen contained in the anode gas. Oxygen contained in the air is supplied to the cathode of the fuel cell stack 1. Then, in the fuel cell stack 1, an electrochemical reaction occurs between the hydrogen and the oxygen that generates electrical energy. In addition, at the cathode of the fuel cell stack 1, the hydrogen ions, generated from hydrogen, and oxygen are combined that generates water.

Gas containing unreacted hydrogen and nitrogen and so forth permeated from the cathode (hereafter referred to as "anode off gas") is discharged from the fuel cell stack 1 to the anode off gas passage 3.

The anode off gas discharged from the anode of the fuel cell stack 1 passes through the anode off gas passage 3 and the anode off gas circulation passage 4, and again is supplied to the anode of the fuel cell stack 1 along with anode gas from the hydrogen tank 7. The anode off gas passage 3 supplies the anode off gas to the gas-liquid separator 12. This allows the anode off gas to be supplied to the anode off gas circulation passage 4 after water is separated from the anode off gas.

Unreacted cathode gas (hereinafter referred to as "cathode off gas") is discharged from the fuel cell stack 1 to the cathode off gas passage 6. The cathode off gas contains the water generated by the fuel cell stack 1 in the form of water vapor. The cathode off gas discharged from the cathode is discharged through the cathode off gas passage 6 to the ambient air.

The ECU 15 is electrically connected to the pump 9, a driving motor (not shown) that drives the pressure regulator 10, the discharge gas temperature sensor 17, the ambient temperature sensor 19A, the ambient humidity sensor 19B (equivalent to one of the sensors), and the stack temperature sensor 20. The ECU 15 controls supply of the pump 9 and the driving motor (not shown) for the pressure regulator 10. The ECU 15 acquires the temperature of the cathode off gas detected by the discharge gas temperature sensor 17. The ECU 15 acquires the ambient temperature detected by the ambient temperature sensor 19A and the ambient humidity detected by the ambient humidity sensor 19B. The ECU 15 acquires the operating temperature of the fuel cell stack 1 measured by the stack temperature sensor 20. The ECU 15 includes a CPU, a ROM, and so forth inside. The CPU executes various processes according to a control program stored in the ROM.

The discharge gas temperature sensor 17 detects the temperature of the cathode off gas that is discharged via the cathode off gas passage 6 to the ambient air. The discharge gas temperature sensor 17 may be provided at any position in the cathode off gas passage 6. For example, the discharge gas temperature sensor 17 may be provided in the vicinity of an exhaust exit (tail end) of the cathode off gas passage 6 so as to measure the temperature of the cathode off gas immediately before being discharged to the ambient air.

The ambient temperature sensor 19A measures the temperature outside the fuel cell system, that is, the ambient temperature. Meanwhile, the ambient humidity sensor 19B measures the ambient humidity. The stack temperature sensor 20 measures the operating temperature of the fuel cell stack 1. The stack temperature sensor 20 may be directly attached to the fuel cell stack 1, or may measure the temperature of the coolant of the fuel cell stack 1.

The vehicle is provided with a vehicle speed sensor 22 (equivalent to one of the sensors) that detects the moving speed of the vehicle, and various levers, operating buttons, knobs, pedals, and so forth that allow a driver to operate the mobile unit. Examples of the various levers, operating buttons, knobs, pedals, and so forth include a shift lever that designates the ratio between the rotational speed of a motor driven by a power source and that of a driving part (for example, a wheel), a wiper lever that turns on and off a wiper, a knob of an in-vehicle device that receives a signal from a global positioning system (GPS) to provide an indication of the present location and time, guidance to a destination, and so forth, and a parking brake lever. The vehicle in accordance with this embodiment has respective sensors that sense operations of the various levers, operating buttons, knobs, pedals, and so forth by the driver (each equivalent to the sensor of the present invention), and executes control according to the operations. During this control, the ECU 15 monitors the operations of the various sensors and so forth to recognize their operating states.

Figure 2:
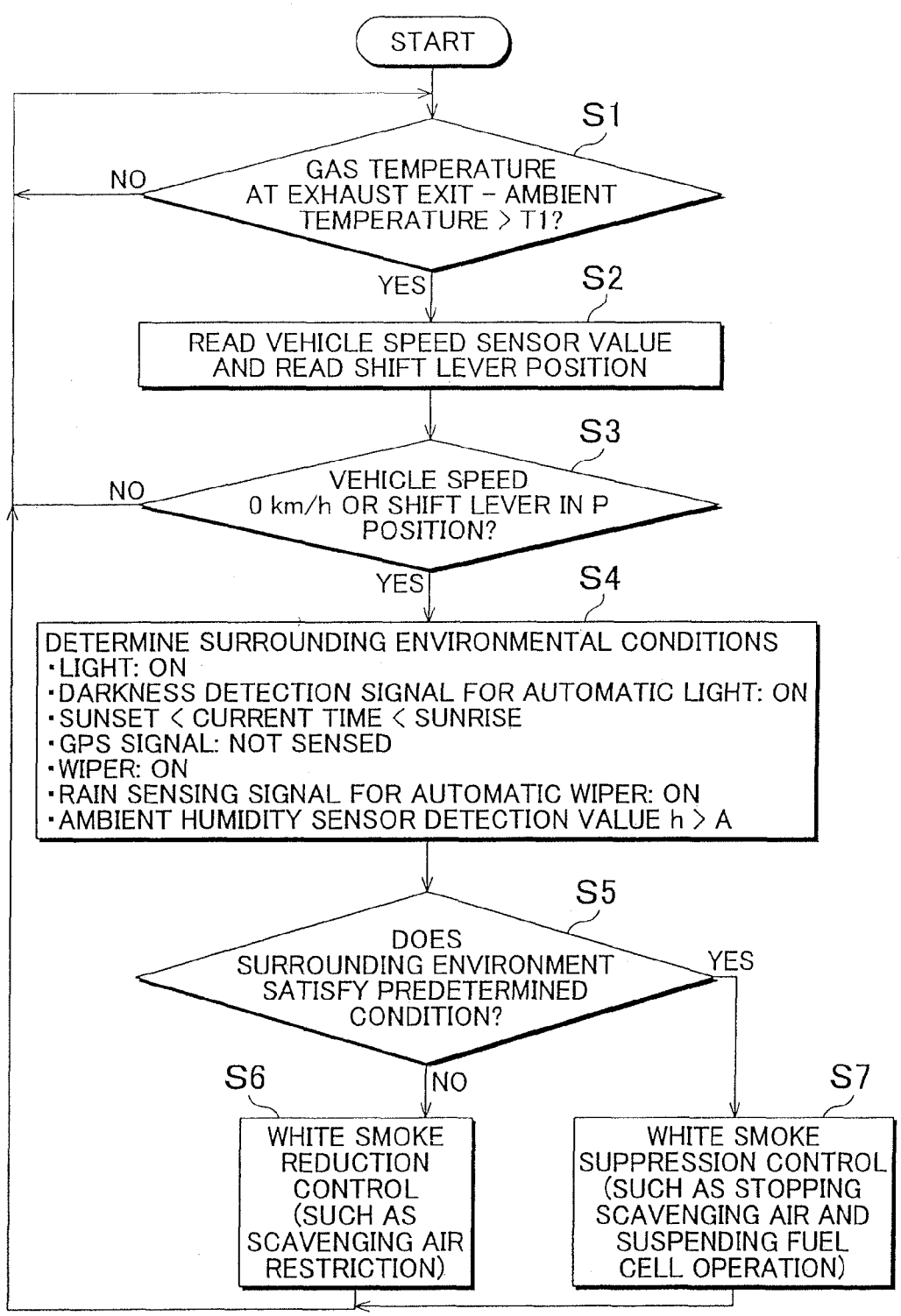
FIG. 2 is a flowchart illustrating the operation of the fuel cell system.

FIG. 2 is a flowchart of an exhaust state control process that is executed by the ECU 15. The process is implemented by a control program executed by the CPU. This process is executed periodically at predetermined time intervals.

In the process, the ECU 15 first acquires the gas temperature at the exhaust exit detected by the discharge gas temperature sensor 17 and the temperature detected by the ambient temperature sensor 19A. Then, the ECU 15 determines whether the difference between the gas temperature at the exhaust exit and the ambient temperature exceeds a predetermined value T1 (S1). If the difference between the gas temperature at the exhaust exit and the ambient temperature does not exceed the predetermined value T1 (NO in S1), the ECU 15 returns the process to S1. In this case, the ECU 15 may execute S1 and the subsequent steps after a predetermined amount of time has elapsed. Here, the predetermined value T1 and the predetermined time may be set as factory default, or set by the dealer or the user of the vehicle, for example. Incidentally, the ECU 15 which executes the process in S1 may be equivalent to the white smoke generation determination section of the present invention.

On the other hand, if the difference between the gas temperature at the exhaust exit and the ambient temperature exceeds the predetermined value T1 (YES in S1), the ECU 15 reads the traveling speed of the vehicle from the vehicle speed sensor 22 and reads the position of the shift lever (S2).

Then, the ECU 15 determines whether the vehicle speed is 0, or determines whether the shift lever is in the parking position (P position) (S3). At this time, the ECU 15 may determine whether the vehicle speed is 0 and whether the shift lever is in the P position. The conditions in S3 may be equivalent to the first condition of the present invention.

Then, if the vehicle speed is not 0, or if the shift lever is not in the P position (NO in S3), the ECU 15 returns the process to S1. On the other hand, if the vehicle speed is 0, or if the shift lever is in the P position (YES in S3), the ECU 15 determines the surrounding environmental conditions (S4). The surrounding environmental conditions include the following, for example. (1) A headlight is on (which may be equivalent to the operating state of the operating section of the present invention). (2) A darkness detection signal for an automatic light is on (which may be equivalent to the environmental state of the present invention). Here, the "automatic light" refers to a headlight that is turned on and off automatically. That is, the automatic light generates a darkness detection signal to turn on the headlight when its controller senses that the brightness in its environment has fallen below a predetermined threshold. (3) It is after a sunset and before a sunrise (which may be equivalent to the environmental state of the present invention). (4) A signal from the GPS cannot be received (which may be equivalent to the environmental state of the present invention). (5) The wiper is on (which may be equivalent to the operating state of the operating section of the present invention). (6) For a vehicle provided with an automatic wiper, a rain sensing signal is on (which may be equivalent to the environmental state of the present invention). (7) A detected ambient humidity h of the ambient humidity sensor 19B exceeds a predetermined value A (which may be equivalent to the environmental state of the present invention). Here, the predetermined value A may be set as factory default, or set by the dealer or the user of the vehicle, for example.

Then, the ECU 15 determines whether the surrounding environment determined in S4 satisfies a predetermined condition (S5). Here, the predetermined condition may be set as factory default, or set by the dealer or the user of the vehicle, for example. If none of these conditions is satisfied (NO in S5), the ECU 15 executes the white smoke reduction control (S6). In this case, the surrounding environmental condition is determined that it is daytime, that it is not rainy, and that the ambient humidity is less than a predetermined value. Thus, it is determined that the visibility of the white smoke is low, and therefore the process to reduce the generated white smoke is executed.

Here, the white smoke reduction control is a process that reduces the amount of scavenging air at the air electrode. For example, the ECU 15 reduces the amount of scavenging air from the pump 9 by a predetermined proportion. Alternatively, the cathode off gas may be heated by a heater (not shown) provided in the cathode off gas passage 6, for example. Conversely, the cathode off gas may be cooled by a heat exchanger (not shown) to a temperature close to the ambient temperature.

The cathode off gas may be heated or cooled based on conditions for white smoke that is generated, which are obtained from the relationship between the ambient temperature and the gas temperature at the exhaust exit, for example. This is made possible by experimentally or empirically preparing a map of the relationship that "the differential between the ambient temperature and the gas temperature at the exhaust exit is $\Delta T$ or less at a humidity of h," and storing the map in a storage device of the ECU 15. Then, the ECU 15 can perform control so as to heat or cool the cathode off gas such that the differential between the ambient temperature and the gas temperature at the exhaust exit is ΔT or less at the ambient humidity.

On the other hand, if any of the above conditions is satisfied (YES in S5), the ECU 15 executes the white smoke suppression control (S7). In this case, the surrounding environmental condition is determined that it is nighttime, that the headlight is used, that it is rainy, or that the ambient humidity exceeds the predetermined value. Thus, the visibility of the white smoke is high, and therefore the process to reduce the generated white smoke is not enough and the white smoke suppression process is executed. Incidentally, the white smoke suppression control in the present invention may be equivalent to the process to further reduce generation of white smoke.

Here, the white smoke suppression control may include, for example, stopping the operation of the pump 9 (that is, stopping scavenging air), and suspending the operation of the fuel cell system by shutting off the hydrogen supply pressure with the pressure regulator 10.

As discussed above, the fuel cell system in accordance with this embodiment can precisely determine whether white smoke reduction is required by determining the visibility of white smoke based on the traveling conditions of the vehicle, the operating state of the vehicle, and the surrounding environmental conditions when the generation of white smoke is highly possible in consideration of the relationship between the temperature of cathode off gas to be discharged to the ambient air and the ambient temperature. Then, the fuel cell system in accordance with this embodiment executes a white smoke reduction process when the visibility of the white smoke is estimated to be not particularly high, and executes a white smoke suppression process when it is estimated to be high. That is, white smoke reduction is switched according to the driving conditions of the vehicle and the surrounding environmental conditions. This contributes to precisely determining whether white smoke reduction is required, and to reducing wasteful energy consumption and a decrease in the power generation efficiency.

In the first embodiment, as described in relation to S4 and S5 of FIG. 2, the ECU 15 executes the white smoke reduction control if none of the above conditions (1) to (7) is satisfied, and executes the white smoke suppression process if any of the above conditions (1) to (7) is satisfied. Alternatively, the ECU 15 may execute the white smoke suppression process (S7) if a specific combination of the above conditions (1) to (7) are satisfied. For example, the ECU 15 may execute the white smoke suppression process if the headlight is on and it is nighttime. Further, the ECU 15 may execute the white smoke suppression process if the wiper is on and the detected ambient humidity exceeds the predetermined value A. Then, the ECU 15 may execute the white smoke reduction process (S6) if the specific combination of the above conditions (1) to (7) are satisfied.

In the first embodiment, if it is determined in S3 of FIG. 2 that the vehicle speed is not 0, or that the shift lever is not in the P position, the process returns to S1. That is, in this case, neither of the white smoke reduction control and the white smoke suppression control is executed. Alternatively, the ECU 15 may first perform the determination in S5 of FIG. 2, that is, determine whether the surrounding environmental conditions are satisfied. Then, in the case where none of the above conditions (1) to (7) is satisfied, the ECU 15 may return the process to S1. That is, the ECU 15 may execute neither of the white smoke reduction control and the white smoke suppression control. Conversely, if any of the above conditions (1) to (7) is satisfied, the ECU 15 may determine whether the vehicle speed is 0, or whether the shift lever is in the P position, and execute either the white smoke reduction control or the white smoke suppression control according to the determination results.

In the above first embodiment, the necessity for white smoke reduction is determined, and either the white smoke reduction control or the white smoke suppression control is executed, depending mainly on whether white smoke is highly visible from outside the vehicle. Alternatively, the ECU 15 may determine the necessity for white smoke reduction, and execute either the white smoke reduction control or the white smoke suppression control, depending on whether the vision of the driver of the vehicle is affected. FIG. 3 shows an example of such a process.

In this process, the ECU 15 first acquires the gas temperature at the exhaust exit detected by the discharge gas temperature sensor 17 and the temperature detected by the ambient temperature sensor 19A. Then, the ECU 15 determines whether the difference between the gas temperature at the exhaust exit and the ambient temperature exceeds a predetermined value T1 (S1). If the difference between the gas temperature at the exhaust exit and the ambient temperature does not exceed the predetermined value T1 (NO in S1), the ECU 15 returns the process to S1. On the other hand, if the difference between the gas temperature at the exhaust exit and the ambient temperature exceeds the predetermined value T1 (YES in S1), the ECU 15 determines the surrounding environmental conditions (S4). These conditions are the same as in the first embodiment, and therefore their descriptions are omitted.

Then, the ECU 15 determines whether the surrounding environment determined in S4 satisfies a predetermined condition (S5). If none of the surrounding environmental conditions (the above conditions (1) to (7)) is satisfied (NO in S5), the ECU 15 returns the process to S1. On the other hand, if any of the surrounding environmental conditions (the above conditions (1) to (7)) are satisfied (YES in S5), the ECU 15 reads the position of the shift lever and a switch signal of the parking brake (S8).

In S9 that follows, the ECU 15 determines whether the shift lever is in the R position (reverse position), or whether the parking brake signal is off. At this time, the ECU 15 may determine whether the shift lever is in the R position and whether the parking brake signal is off.

Then, if the shift lever is not in the R position, or if the parking brake signal is on (NO in S9), the ECU 15 executes the white smoke reduction control (S10). In this case, the vehicle does not move in the direction in which gas is discharged from the exhaust exit, and therefore the ECU 15 determines that the possibility that the vision of the driver is affected is low, even under conditions where white smoke is generated and its visibility is relatively high. In this case, the ECU 15 determines that the white smoke reduction process is sufficient.

Alternatively, if the shift lever is in the R position, or if the parking brake signal is off (YES in S9), the ECU 15 determines that the possibility that the vehicle is moving in the direction in which gas is discharged from the exhaust exit is high. In this case, the ECU 15 determines not only that the white smoke is easily viewable from outside the vehicle, but also that the white smoke can affect the vision of the driver, and thus executes the white smoke suppression control (S11).

As discussed above, in this modification, the ECU 15 estimates the influence of white smoke on the driver by determining whether the advancing direction of the vehicle coincides with the discharging direction of gas. Then, the ECU 15 executes the white smoke suppression control in the case where the advancing direction of the vehicle coincides with the discharging direction of gas.

In the white smoke suppression control, the ECU 15 stops scavenging air, suspends the operation of the fuel cell system, and/or the like. On the other hand, in the white smoke reduction control, the ECU 15 restricts scavenging air, heats the cathode off gas with a heater, and/or the like.

According to such control, the ECU 15 executes the white smoke reduction control when the visibility of the white smoke is high, and executes the white smoke suppression process when the white smoke affects the vision of the driver, allowing efficient utilization of the fuel cell system. For example, it is possible to very precisely determine whether to stop scavenging air for the fuel cell stack 1 or to suspend the operation of the fuel cell system.

In the above embodiment, the ECU 15 determines in S3 of FIG. 2 whether the vehicle speed is 0, or whether the shift lever is in the P position. However, the white smoke reduction process or the white smoke suppression process may be executed when the vehicle speed is at or below a predetermined speed, from the standpoint of the merchantability or upon user request. In this case, the predetermined speed may be set as factory default, adjusted by the dealer, or set by the user. If the vehicle speed is at or below (or below) the predetermined speed, the ECU 15 executes the processes in S4 to S7 of FIG. 2.

Figure 5:
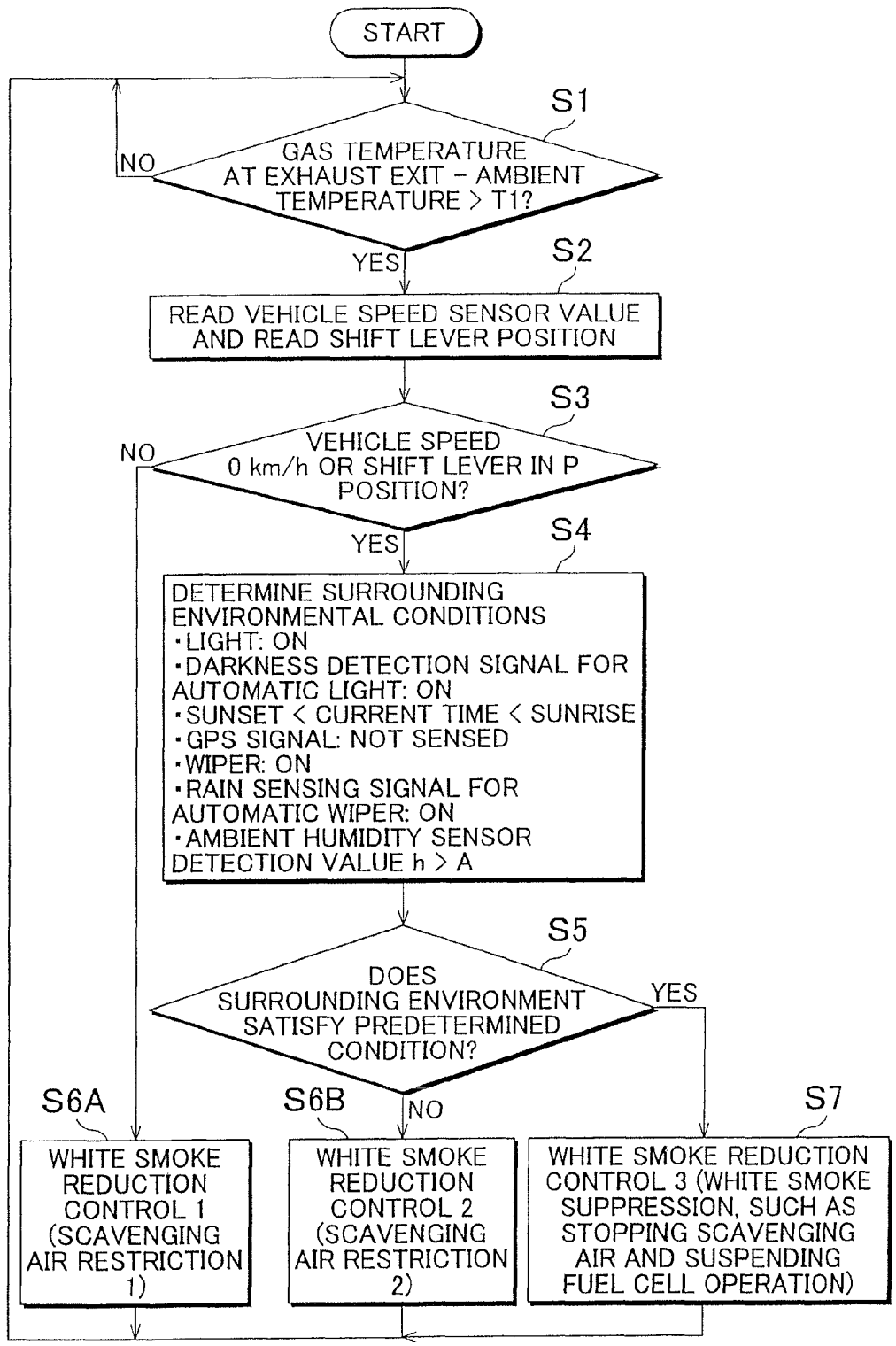
FIG. 5 shows an example process of the white smoke reduction control.

Referring to FIGS. 4 and 5, a fuel cell system in accordance with a second embodiment of the present invention will be described. In the above first embodiment, the ECU 15 does not execute white smoke reduction in the case where the vehicle speed is not 0, or in the case where the shift lever is not in the P position. Further, in the case where the vehicle speed is 0, or in the case where the shift lever is in the P position, the ECU 15 selectively executes the white smoke reduction control or the white smoke suppression control depending on the status of whether the surrounding environmental conditions (1) to (7) are satisfied. Alternatively, the fuel cell system in accordance with the second embodiment of the present invention executes white smoke reduction in more diversified levels. In the description below, white smoke reduction is executed in white smoke reduction control 1, white smoke reduction control 2, and white smoke reduction control 3 (white smoke suppression control). The other configuration and function of this embodiment are the same as those of the first embodiment. Thus, like processes are denoted by like reference numerals to omit their descriptions. The system configuration is the same as that shown in FIG. 1.

FIG. 4 shows the classification of the white smoke reduction process by the fuel cell system in accordance with this embodiment. In the white smoke reduction control 1, the scavenging air is reduced by 30%, and the power for heating the cathode off gas is set to 300 watts, for example. Reducing the scavenging air by 30% means reducing by 30% the driving power for the pump 9 at the air electrode side. In the white smoke reduction control 2, the scavenging air is reduced by 60%, and the power for heating the cathode off gas is set to 600 watts, for example. In the white smoke reduction control 3, the scavenging air is reduced by 100%, and the power for heating the cathode off gas is set to 1000 watts, for example. That is, in the white smoke reduction control 3, the pump 9 is stopped to stop the scavenging air.

In this case, the operation of the fuel cell system itself may be stopped by shutting off the hydrogen pressure with the pressure regulator 10, for example. In this way, the ECU 15 compulsorily suppresses the generation of white smoke.

FIG. 5 shows the control by the ECU 15 in the fuel cell system. The steps S1, S2, and S3 in this process are the same as those in the first embodiment, and therefore their descriptions are omitted.

If the determination in S3 is NO, the ECU 15 executes the white smoke reduction control 1 (S6A). On the other hand, if the determination in S3 is YES, the ECU 15 determines the surrounding environmental conditions (S4). The surrounding environmental conditions determined in S4 are identical to the conditions (1) to (7) described in relation to the first embodiment.

Then, if none of the conditions (1) to (7) is satisfied, the ECU 15 executes the white smoke reduction control 2 (S6B). However, if any of the conditions (1) to (7) is satisfied, the ECU 15 executes the white smoke reduction control 3 (S6C). That is, the scavenging air for the fuel cell stack 1 is stopped, or the fuel cell system is suspended to suppress the generation of white smoke.

As discussed above, according to the fuel cell system in accordance with this embodiment, white smoke reduction can be executed in more diversified levels than in the first embodiment.

As described in relation to the modification of the first embodiment, the ECU 15 may execute the white smoke suppression process (S7) when a specific combination of the above conditions (1) to (7) are satisfied. For example, the ECU 15 may execute the white smoke suppression process if the headlight is on and it is nighttime. Further, the ECU 15 may execute the white smoke suppression process if the wiper is on and the detected ambient humidity exceeds the predetermined value A.

Figure 3:
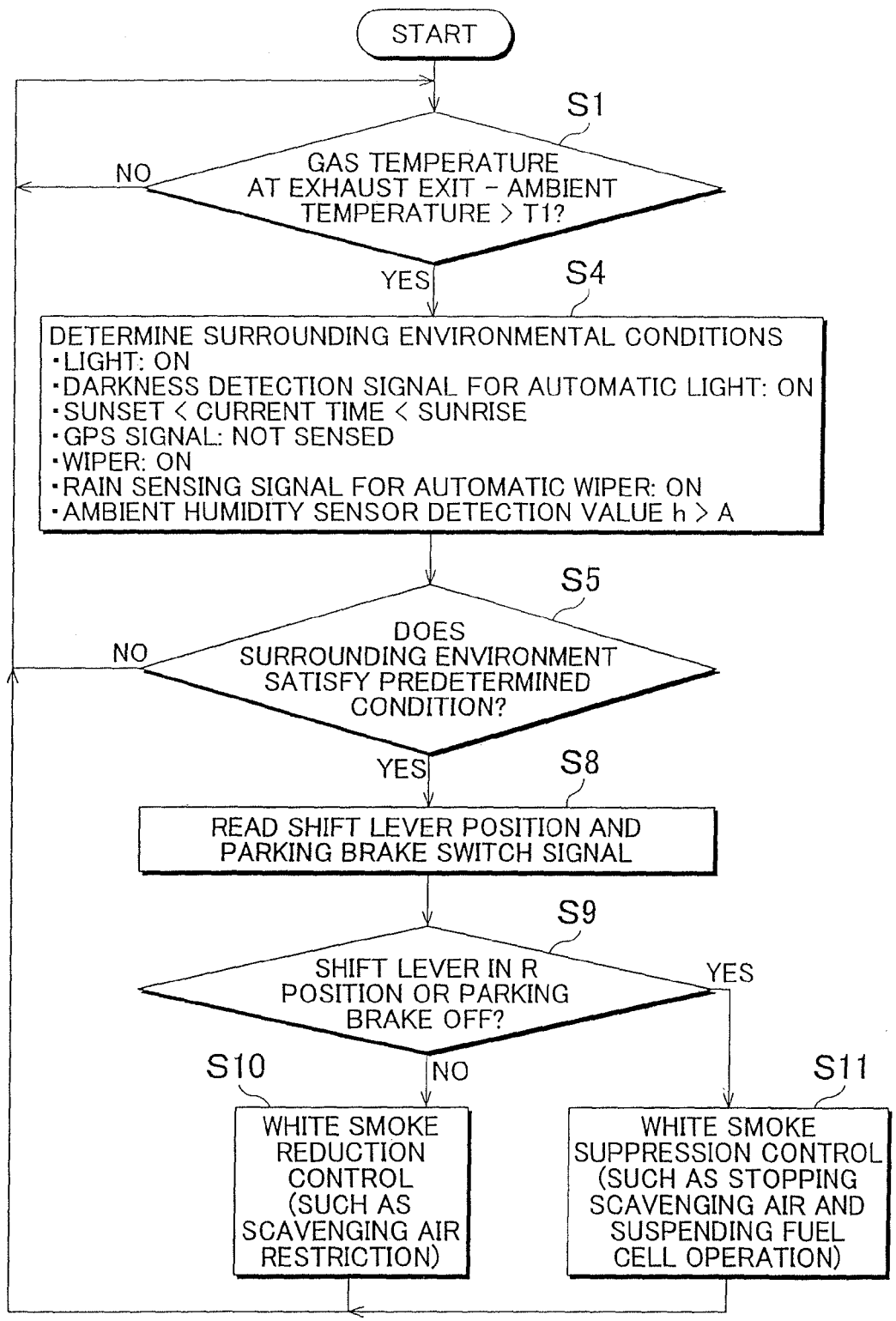
FIG. 3 shows an example process of the white smoke reduction control.
Figure 6:
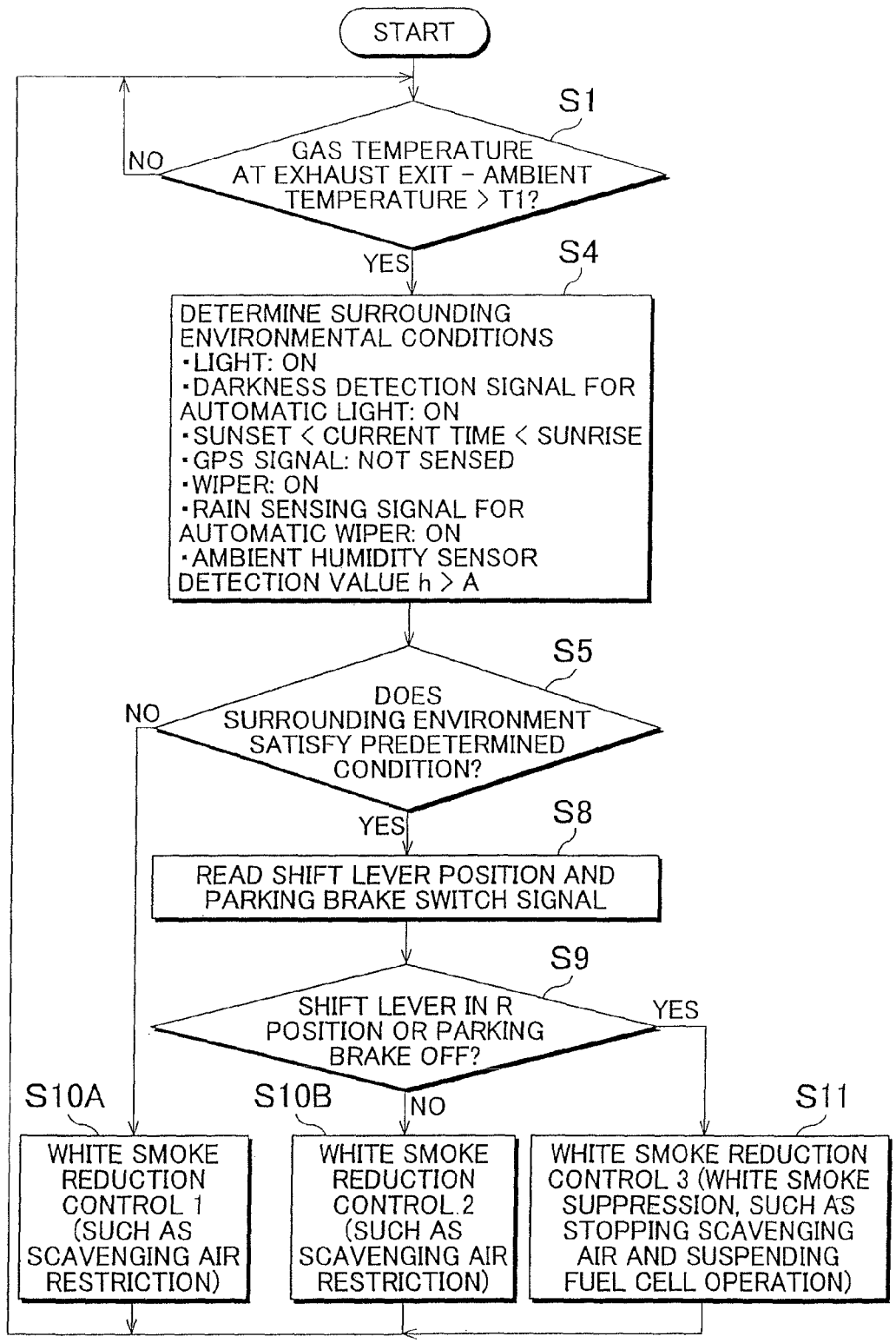
FIG. 6 shows an example process of the white smoke reduction control.

In addition, as described in relation to FIG. 3, the ECU 15 may determine the necessity for white smoke reduction, and execute either the white smoke reduction control or the white smoke suppression control, depending on whether the vision of the driver of the vehicle is affected. FIG. 6 shows an example of such a process.

In this process, when the surrounding environment satisfies none of the conditions (1) to (7)) (NO in S5), the ECU 15 executes the white smoke reduction control 1 (S10A). On the other hand, if any of the surrounding environmental conditions (the above conditions (1) to (7)) are satisfied (YES in S5), the ECU 15 reads the position of the shift lever and a switch signal of the parking brake (S8). Subsequently, the ECU 15 determines whether the shift lever is in the R position, or whether the parking brake signal is off.

Then, if the shift lever is not in the R position, or if the parking brake signal is on (NO in S9), the ECU 15 executes the white smoke reduction control 2 (S10B). On the other hand, if the shift lever is in the R position, or if the parking brake signal is off (YES in S9), the ECU 15 determines that the possibility that the vehicle moves in the direction in which gas is discharged from the exhaust exit is high. In this case, the ECU 15 determines not only that the white smoke is easily viewable from outside the vehicle, but also that the white smoke can affect the vision of the driver, and executes the white smoke suppression control (S11).

Figure 7:
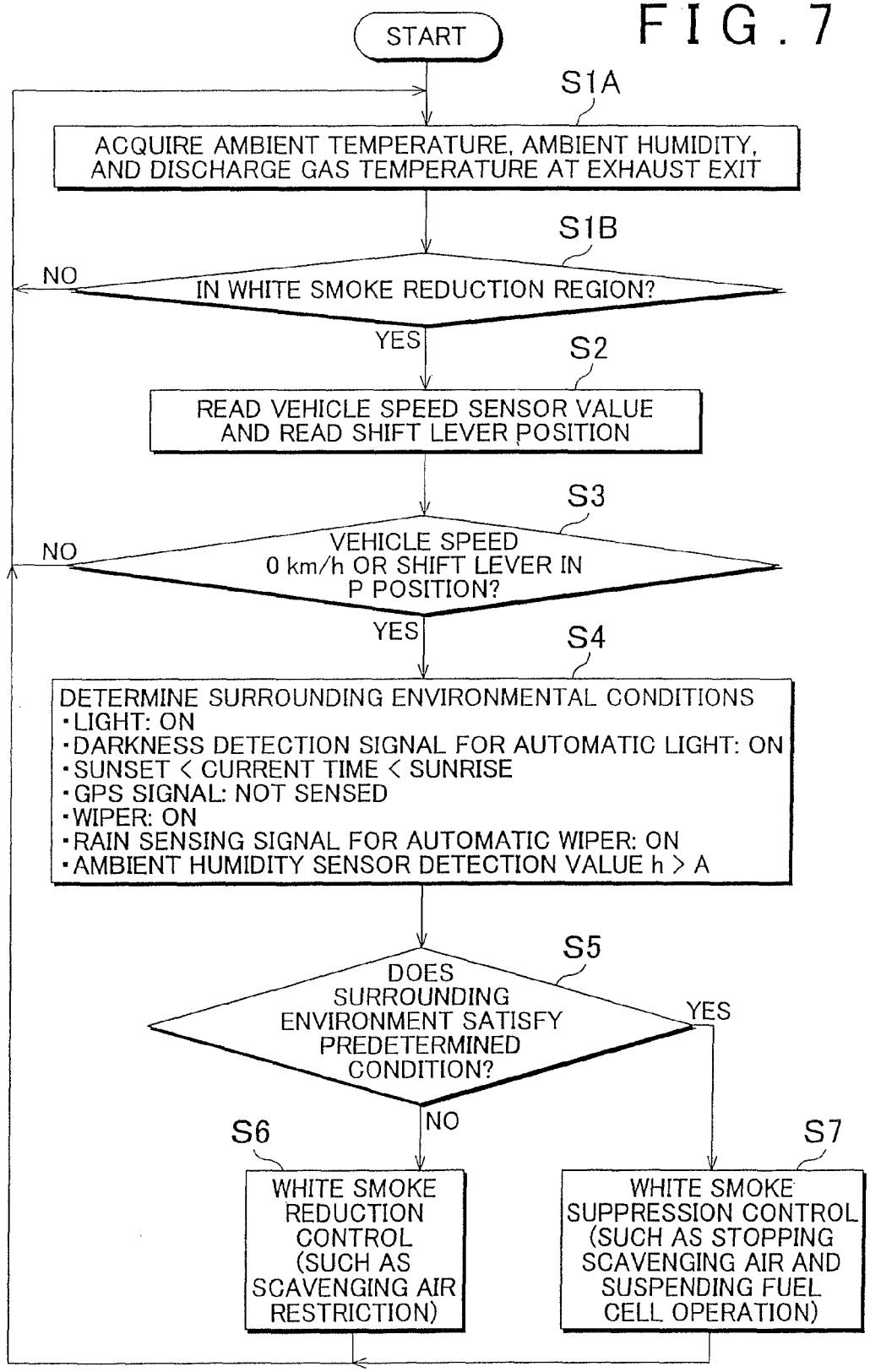
FIG. 7 is a flowchart illustrating the operation of the fuel cell system.
Figure 8:
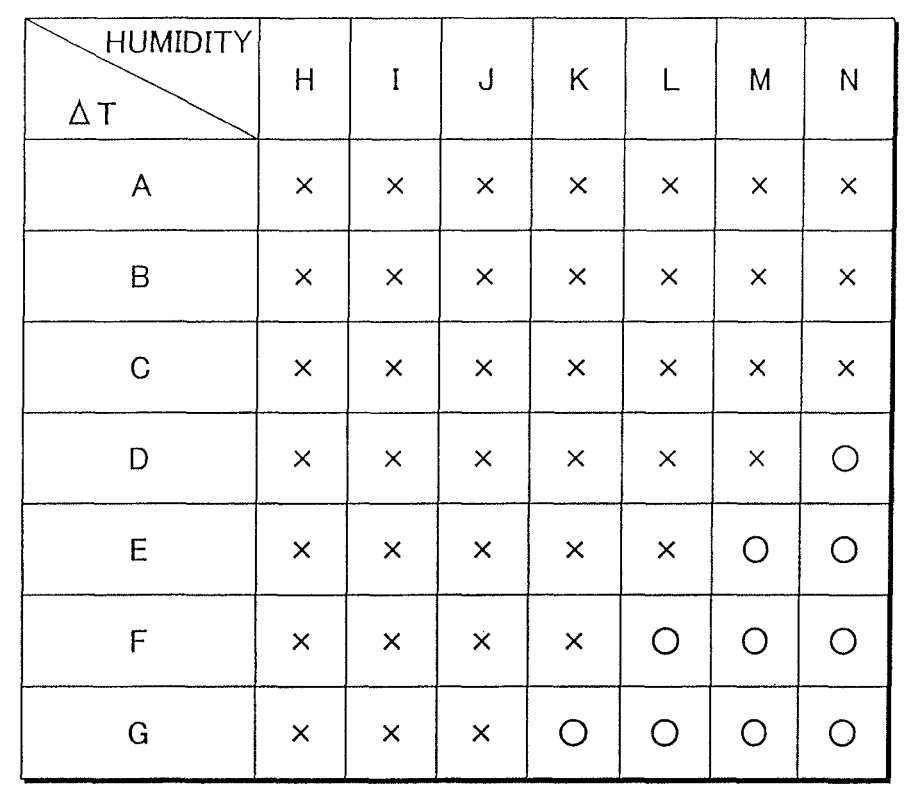
Figure 9:
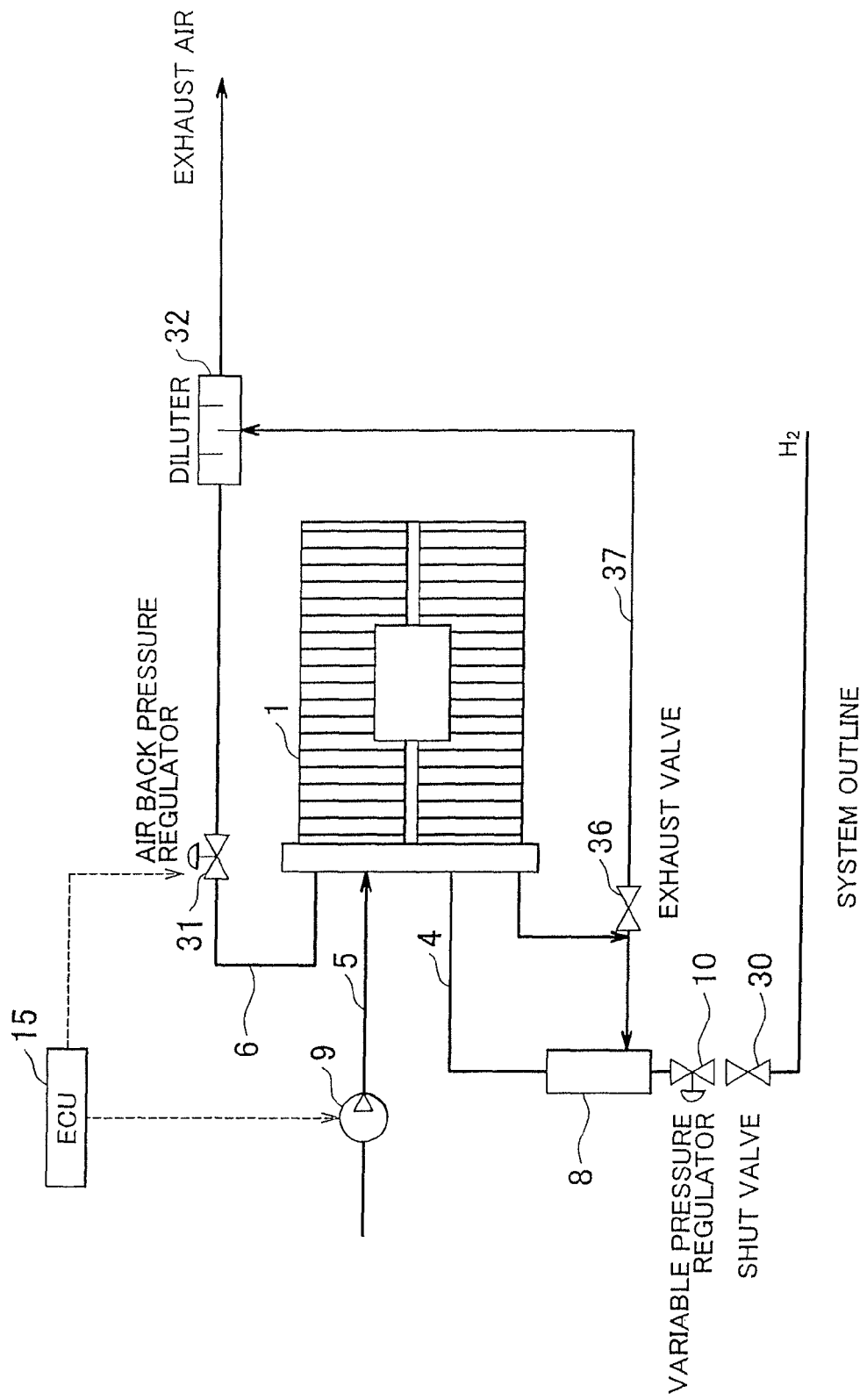
FIG. 9 is a configuration diagram of the fuel cell system.

Referring to FIGS. 7 to 9, a third embodiment of the present invention will be described. In the first and second embodiments, the ECU 15 determines whether white smoke reduction is necessary based on the difference between the gas temperature at the exhaust exit and the ambient temperature (see the process in S1 of FIGS. 2, 3, 5, and 6).

Alternatively, the ECU 15 may determine whether white smoke reduction is necessary based on the surrounding environmental conditions of the vehicle, which include the ambient temperature and the ambient humidity, and the gas temperature at the exhaust exit. The other configuration and function of this embodiment are the same as those of the first and second embodiments. Like components are denoted by like reference numerals to omit their descriptions.

FIG. 7 is a flowchart illustrating the operation of the fuel cell system in accordance with the embodiment of the present invention.

The ECU 15 first acquires the temperature of the cathode off gas detected by the discharge gas temperature sensor 17 (S1A). The ECU 15 also acquires the ambient temperature detected by the ambient temperature sensor 19A (S1A). The ECU 15 further acquires the ambient humidity detected by the ambient humidity sensor 19B (S1A). In this embodiment, the ambient humidity measured by the ambient humidity sensor 19B is referred to as "detected ambient humidity."

Next, the ECU 15 makes a determination as to a white smoke reduction region based on the temperature of the cathode off gas, the detected ambient temperature, and the detected ambient humidity (S1B).

In S1B, the term "white smoke reduction region" refers to the state where water vapor contained in the cathode off gas discharged to the ambient air is white and visible. The relationship between the white smoke reduction region and the temperature of the cathode off gas, the ambient temperature, and the ambient humidity may be obtained in advance by experiment or by simulation. For example, a map (table) as shown in FIG. 8 is prepared in advance by experiment or by simulation. Then, the ECU 15 may make a determination as to the white smoke reduction region using the map.

The symbol ΔT indicated in FIG. 8 represents the difference between the temperature of the cathode off gas and the ambient temperature. The term "humidity" indicated in FIG. 8 refers to the ambient humidity. The circular marks in FIG. 8 indicate that ΔT1 and the ambient humidity are in the white smoke reduction region. The X marks in FIG. 8 indicate that ΔT1 and the ambient humidity are not in the white smoke reduction region. If the map in FIG. 8 is used to determine whether ΔT1 and the ambient humidity are in the white smoke reduction region, the ECU 15 calculates ΔT1, the difference between the temperature of the cathode off gas and the ambient temperature. Then, the ECU 15 references the map shown in FIG. 8 to determine whether ΔT1 and the ambient humidity are in the white smoke reduction region (S1B).

If ΔT1 and the ambient humidity are determined to be in the white smoke reduction region (YES in S1B), the ECU 15 executes the processes in and after S2. The processes in and after S2 are the same as those in the first embodiment and the second embodiment, and therefore their descriptions are omitted. On the other hand, if the ECU 15 determines that ΔT1 and the ambient humidity are not in the white smoke reduction region (NO in S1B), the process is returned to S1A.

According to this embodiment, it is possible to determine at an initial stage whether white smoke reduction is required in consideration of the ambient humidity as well.

In addition, in and after S2 of FIG. 7, the same processes as those in and after S2 of FIG. 2 are executed. Alternatively, in and after S2 of FIG. 7, the same processes as those in and after S4 of FIG. 3 may be executed. As a further alternative, the same processes as those in and after S2 of FIG. 5, or those in and after S4 of FIG. 6, of the second embodiment may be executed in and after S2 of FIG. 7.

Figure 10:
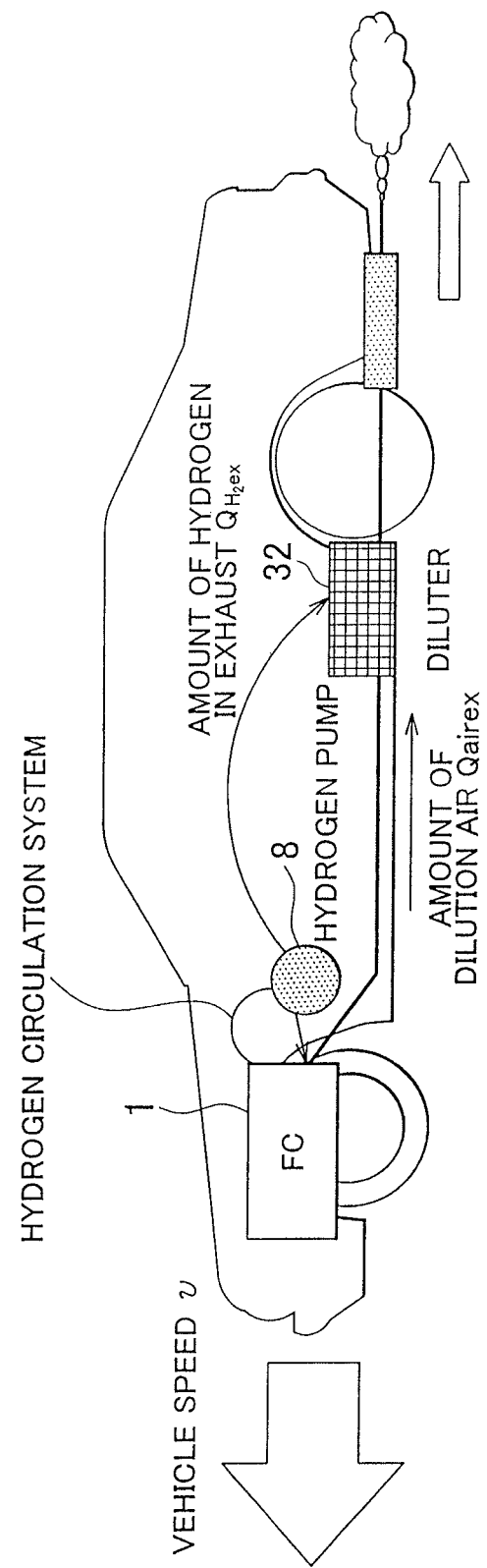
FIG. 10 shows the concept of a vehicle equipped with the fuel cell system.
Figure 11:
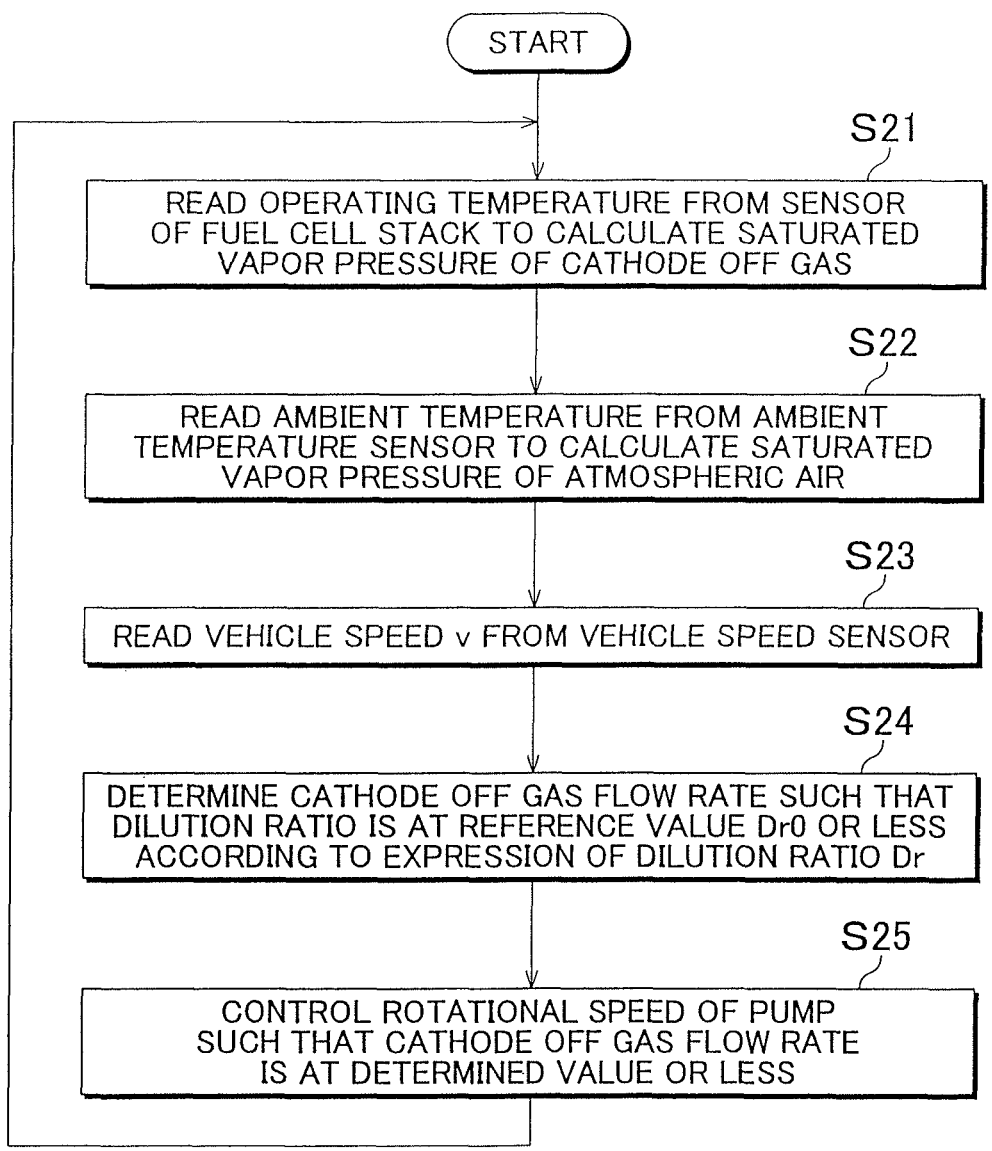
FIG. 11 shows an example process of the white smoke reduction control.

Referring to FIGS. 9 to 11, a fuel cell system in accordance with a fourth embodiment of the present invention will be described. In the first to third embodiments, when white smoke reduction is determined to be necessary, then the ECU 15 executes the white smoke reduction control or the white smoke suppression control depending on whether white smoke is highly visible from outside the vehicle, or whether white smoke affects the vision of the driver.

In this embodiment, the fuel cell system dilutes the cathode off gas containing water vapor and having passed through the fuel cell stack 1 with air that has not passed through the fuel cell stack 1. In this case, the dilution ratio with air containing water vapor as the target of control is determined using an evaluation expression reflecting the speed of the vehicle. The other configuration and function are the same as those of the first to third embodiments. Like components are denoted by like reference numerals to omit their descriptions.

FIG. 9 is a configuration diagram of a fuel cell system in accordance with this embodiment. In FIG. 9, compared to the configuration of FIG. 1, an air back pressure regulator 31 and a diluter 32 are added at the cathode side. The cathode off gas passage 6 is connected to the diluter 32 from the cathode side.

At the anode side, an anode off gas branch passage 37 is connected to the anode off gas passage 3 via an exhaust valve 36. The anode off gas branch passage 37 is also connected to the diluter 32. Furthermore, in FIG. 9, a shut valve 30 is provided upstream of the pressure regulator 10 for hydrogen.

The ECU 15 controls the air backpressure regulator 31, the exhaust valve 36, and the pump 9 to control the dilution ratio of the anode off gas and the cathode off gas.

FIG. 10 shows the concept of a vehicle equipped with the fuel cell system. In FIG. 10, the vehicle advances in the direction of the arrow at a speed v. The flow rate of the cathode off gas discharged from the cathode off gas passage 6 to the diluter 32 at this time is defined as Qairex.

In this case, the dilution ratio Dr of the cathode off gas at the vehicle speed v, which reflects the effect that the cathode off gas is diffused by the ambient air, is defined by Expression 1 below.

$$\text{Dilution ratio: } Dr = \frac{\frac{P_{H2O@FC}}{P_{H2O@atm}} \times Q_{air_{ex}}}{Q_{air_{ex}} + k \cdot v} \qquad \text{[Expression 1]}$$

Where, k: Conversion factor to obtain dilution air amount $Q_{air_{ex}}$: Amount of exhaust air $P_{H2O@FC}$: Saturated water vapor pressure at operating temperature of FC $P_{H2O@atm}$: Saturated water vapor pressure at ambient temperature In the expression, k represents a conversion factor for calculating the amount of air with which the cathode off gas is diluted at the vehicle speed v, $P_{H2O@FC}$ is a saturated vapor pressure at the operating temperature of the fuel cell stack 1, and $P_{H2O@atm}$ is a saturated vapor pressure at the ambient temperature.

In the physical sense, Expression 1 means that the concentration of the cathode off gas is lowered by dilution as the vehicle speed v is higher. That is, if the saturated vapor pressure at the operating temperature of the fuel cell stack 1 is higher than the saturated vapor pressure at the ambient temperature, $P_{H2O@FC}/P_{H2O@atm}$ is more than 1, which satisfies the condition under which white smoke is generated. Here, $P_{H2O@FC}/P_{H2O@atm}$ represents the proportion of the cathode off gas that is condensed into water droplets when the gas is released to the ambient air. In addition, $(P_{H2O@FC}/P_{H2O@atm}) \times Q_{airex}$ represents the amount of the cathode off gas that is condensed into water droplets when the gas is released to the ambient air.

When the vehicle speed v is sufficiently high, however, white smoke is not noticeable due to the same effect as when the cathode off gas is diluted. The dilution ratio Dr indicates the degree of such effect.

Thus, $P_{H2O@FC}/P_{H2O@atm}$ is set to a plurality of values, and for each value, the degree of the generation of white smoke is observed while varying the cathode off gas flow rate Qairex and the vehicle speed v. Based on the values obtained from such experiments, the relationship between $P_{H2O@FC}$, $P_{H2O@atm}$, Qairex, and the vehicle speed v and the degree of the generation (visibility) of white smoke may be obtained. From the values obtained from the experiments, the value to be fulfilled by the dilution ratio Dr (hereinafter referred to as "reference value Dr0") is determined. Then, with the reference value Dr0 set in a memory (not shown) of the ECU 15, the operating state of the fuel cell may be controlled such that the dilution ratio Dr is at the reference value Dr0 or less.

FIG. 11 is a flowchart showing the control executed by the ECU 15 in that case. In this process, the ECU 15 first reads the operating temperature of the fuel cell stack 1 from the stack temperature sensor 20 to calculate the saturated vapor pressure $P_{H2O@FC}$ of the cathode off gas (S21). However, the exhaust gas temperature sensor 17 of FIG. 1 may be used in place of the stack temperature sensor 20 to detect the temperature of the cathode off gas.

Next, the ECU 15 reads the ambient temperature from the ambient temperature sensor 19A to calculate the saturated vapor pressure of the ambient air $P_{H2O@atm}$ (S22). Further, the ECU 15 reads the vehicle speed v from a vehicle speed sensor (not shown) (S23). Then, the ECU 15 determines the cathode off gas flow rate Qairex such that the dilution ratio Dr is at the reference value Dr0 or less according to Expression 1 (S24). Then, the ECU 15 controls the rotational speed of the pump 9 such that the cathode off gas flow rate is at Qairex or less (S25).

As discussed above, according to the fuel cell system in accordance with the fourth embodiment, the ECU 15 controls the discharge amount of the cathode off gas, that is, the rotational speed of the pump 9, such that the dilution ratio is at the reference value Dr0 or less based on the saturated vapor pressure of the cathode off gas, the saturated vapor pressure of the ambient air, and the vehicle speed. According to such control, white smoke due to the cathode off gas may be controlled so as not to be noticeable by controlling the discharge amount, that is, the dilution ratio, of the cathode off gas according to the vehicle speed v.

In the fourth embodiment, the ECU 15 controls the discharge amount, that is, the dilution ratio, of the cathode off gas according to the vehicle speed v to suppress white smoke. In such control, the ECU 15 may further control the backpressure at the cathode side. The backpressure at the cathode side is controlled by the opening of the backpressure regulator 31 at the exit of the flow path of the fuel cell stack 1 at the cathode side.

In the fuel cell system, the ECU 15 calculates the amount in mass of the cathode off gas that is discharged. For example, it is assumed that power is generated while the cathode off gas is required that is discharged in an amount of M gram. As the backpressure at the cathode side is higher, the volume of the off gas that is discharged is smaller for the same mass. For example, when the back pressure doubles, the required flow rate of the off gas that is discharged is halved.

On the other hand, the saturated vapor pressure relies upon the temperature, rather than the backpressure, of the off gas, and therefore a generally constant amount of water vapor is contained in the off gas of the same volume, regardless of the backpressure. Thus, when the back pressure doubles, the required volumetric flow rate of the off gas that is discharged is halved. Thus, at this time, the amount of water vapor to be discharged together with the off gas is also halved.

With the influence of the backpressure reflected in the dilution ratio given by Expression 1, Expression 2 below can be obtained.

$$Dr = \frac{\frac{P_{H2O@FC}}{P_{H2O@atm}} \times \left(Q_{airex} \times \frac{P_{atm}}{P_{back}}\right)}{Q_{airex} + k \cdot v}$$ [Expression 2]

$$Q_{airex} \times \frac{P_{atm}}{P_{back}}:$$

Changes in volumetric flow rate brought about by increasing backpressure

In the expression, Patm represents the atmospheric pressure, Pback represents the backpressure at the cathode side, and Qair×(Patm/Pback) represents changes in volumetric flow rate brought about by increasing the backpressure. Thus, for the same amount (in mass) of the off gas to be discharged, the dilution ratio may be reduced by the changes in volumetric flow rate. Conversely, during operation when the backpressure is reduced, the generation of white smoke may be reduced by reducing the amount in mass of the off gas to be discharged.

As described in the above modification 1, the ECU 15 may reduce the generation of white smoke by further controlling the back pressure in addition to performing the process of FIG. 11. If the control of the backpressure is given priority, the ECU 15 may increase and reduce the amount in mass of the off gas to be discharged according to changes in back pressure.

In the fourth embodiment, the ECU 15 controls the discharge amount, that is, the dilution ratio, of the cathode off gas according to the vehicle speed v to suppress the generation of white smoke. In this case, the influence of winds around the vehicle may be reflected in the vehicle speed v. For example, wind pressure sensor may be disposed at four positions around the vehicle, namely, at the front, rear, left, and right sides of the vehicle, to calculate the relative speed V between the vehicle and the ambient air based on the wind pressures, irrespective of whether the vehicle is stationary or traveling. As the relative speed V between the vehicle and the ambient air, the larger one of the relative speed V1 in the longitudinal direction, which is based on the wind pressure in the longitudinal direction of the vehicle, and the relative speed V2 in the lateral direction, which is based on and the lateral direction of the vehicle, may be used.

Then, the ECU 15 may calculate the dilution ratio of Expression 1 based on the relative speed V between the vehicle and the ambient air in place of the vehicle speed v.

In this way, while the fuel cell system suppresses the generation of white smoke, the limit amount of the cathode off gas can be discharged is increased, even when the vehicle is traveling at a low speed or stationary, by calculating the dilution ratio with the relative speed between the vehicle and the ambient air taken into account.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An exhaust state control device for a fuel cell for a mobile unit that detects a state of exhaust gas from a fuel cell mounted on a mobile unit, comprising:
   an exhaust gas temperature sensor that measures, as a state of the exhaust gas, a temperature of the exhaust gas in a discharge passage that discharges the exhaust gas from a main body of the fuel cell;
   an ambient temperature sensor that measures, as a state of the ambient air, a temperature of the ambient air to which the exhaust gas is to be discharged;
   a motion sensor that detects movement of the mobile unit;
   a white smoke generation determination section that determines whether white smoke is generated from generated water of the fuel cell based on a relationship between the state of exhaust gas and the state of ambient air;
   a condition determination section that determines whether a predetermined condition to reduce white smoke is satisfied based on a detection signal from the motion sensor when the white smoke generation determination section determines that white smoke is generated;
   a control section that activates a process to reduce white smoke if the condition determination section determines that the predetermined condition is satisfied;
   an operation state sensor that detects an operating state of an operating section that operates the mobile unit;
   a sensor that senses a surrounding environmental state of the mobile unit; and
   an ambient humidity sensor that measure a humidity of the ambient air to which the exhaust gas is to be discharged, wherein:
   the control section activates a process to reduce white smoke when the condition determination section determines that a first predetermined condition is satisfied;
   the control section activates a process to further reduce generation of white smoke than when the first predetermined condition is determined to be satisfied, if the condition determination section determines that a second predetermined condition is satisfied;
   the first predetermined condition is satisfied if either one of the conditions, where a moving speed of the mobile unit is determined to be at or below a predetermined value and where a visibility of white smoke around the mobile unit is determined to be higher than that in a reference environment, is satisfied;
   the second predetermined condition is satisfied if both the conditions, where the moving speed of the mobile unit is determined to be at or below the predetermined value and where the visibility of white smoke around the mobile unit is determined to be higher than that in the reference environment, are satisfied;
   the reference environment includes a daytime environment and a non-rainy environment;
   the condition determination section determines whether the predetermined condition to reduce white smoke is satisfied based on at least one of the detected moving state of the mobile unit, the detected operating state of the operating section that operate the mobile unit, and the detected surrounding environmental state of the mobile unit;
   the mobile unit is a vehicle;
   the operating state of the operating section is determined based on whether a headlight is on;
   the surrounding environmental state is determined based on at least one of: whether a darkness detection signal for an automatic light is on; whether a current time is after a sunset and before a sunrise; whether a signal from a global positioning system cannot be received; whether a wiper is on; whether a rain sensing signal is on; and whether a detection value of the ambient humidity sensor exceeds a predetermined value; and
   the condition determination section determines that the reference environment is the daytime, non-rainy environment and the humidity of the ambient air is less than the predetermined value if none of the determined states above is satisfied.

2. The exhaust state control device for a fuel cell according to claim 1, wherein the condition where the moving speed of the mobile unit is determined to be at or below the predetermined value includes a state where the mobile unit is stationary.

3. The exhaust state control device for a fuel cell according to claim 1, wherein the moving speed of the mobile unit is an absolute speed of the mobile unit or a relative speed between the mobile unit and the ambient air around the mobile unit.

* * * * *